United States Patent [19]
Fletcher

[11] Patent Number: 5,476,203
[45] Date of Patent: Dec. 19, 1995

[54] BICYCLE CRANK SHAFT SUPPORT CARRIER

[76] Inventor: James D. Fletcher, 4661 Calienta - Bodfish Rd., Calienta, Calif. 93518

[21] Appl. No.: 184,996

[22] Filed: Jan. 24, 1994

[51] Int. Cl.⁶ .................................................. B60R 9/00
[52] U.S. Cl. ..................... 224/536; 224/315; 224/323; 224/324; 224/521; 224/523; 224/526; 224/531; 224/546; 224/924; 211/5; 211/22
[58] Field of Search .................... 224/42.03 B, 42.03 R, 224/42.43, 42.45 R, 315, 323, 324, 521, 523–526, 531–536, 546, 564, 565, 570, 924; 211/5, 17–22

[56] References Cited

U.S. PATENT DOCUMENTS

| | | | |
|---|---|---|---|
| 484,941 | 10/1892 | Muller | 211/22 |
| 564,733 | 7/1896 | Beardsey | 211/22 |
| 2,415,286 | 2/1947 | Hyde | 224/42.03 B |
| 2,431,400 | 11/1947 | Iverson | 224/42.03 B |
| 3,591,029 | 7/1971 | Coffey | 224/42.03 B X |
| 3,993,229 | 11/1976 | Summers. | |
| 4,084,736 | 4/1978 | Jacobs, Jr. . | |
| 4,126,228 | 11/1978 | Bala et al. | 211/5 |
| 4,189,274 | 2/1980 | Shaffer. | |
| 4,275,981 | 6/1981 | Bruhn. | |
| 4,442,961 | 4/1984 | Bott | 224/42.03 B |
| 4,524,893 | 6/1985 | Cole. | |
| 4,629,104 | 12/1986 | Jacquet | 224/324 |
| 4,700,873 | 10/1987 | Young | 224/324 X |
| 4,823,997 | 4/1989 | Krieger | 224/42.03 B |
| 5,025,932 | 6/1991 | Jay | 211/20 |
| 5,092,504 | 3/1992 | Hannes et al. . | |
| 5,232,134 | 8/1993 | Allen. | |

FOREIGN PATENT DOCUMENTS

| | | | |
|---|---|---|---|
| 0009695 | of 1891 | United Kingdom | 211/22 |
| 0004120 | of 1893 | United Kingdom | 211/22 |
| 0021262 | of 1893 | United Kingdom | 211/22 |

*Primary Examiner*—J. Casimer Jacyna
*Attorney, Agent, or Firm*—Henry M. Bissell

[57] ABSTRACT

Bicycle carrier apparatus includes an H-shaped support frame bearing a pair of opposed threaded clamping members for rigidly gripping the bicycle pedal crank arm mounting bolts on opposite ends of the central crank arm shaft. A further support for the front wheel is provided in which the front wheel tire is frictionally engaged in a secure clamping device. A pair of individual bicycle carriers are affixed to a longitudinal support member which attaches to the receiver portion of a standard vehicle-mounted trailer hitch. An additional pair of bicycle carriers in a similar configuration may be connected to the first carrier apparatus by means of a simple connector assembly. A cartop rack is also disclosed as well as a variant which also mounts to a trailer hitch receiver.

19 Claims, 4 Drawing Sheets

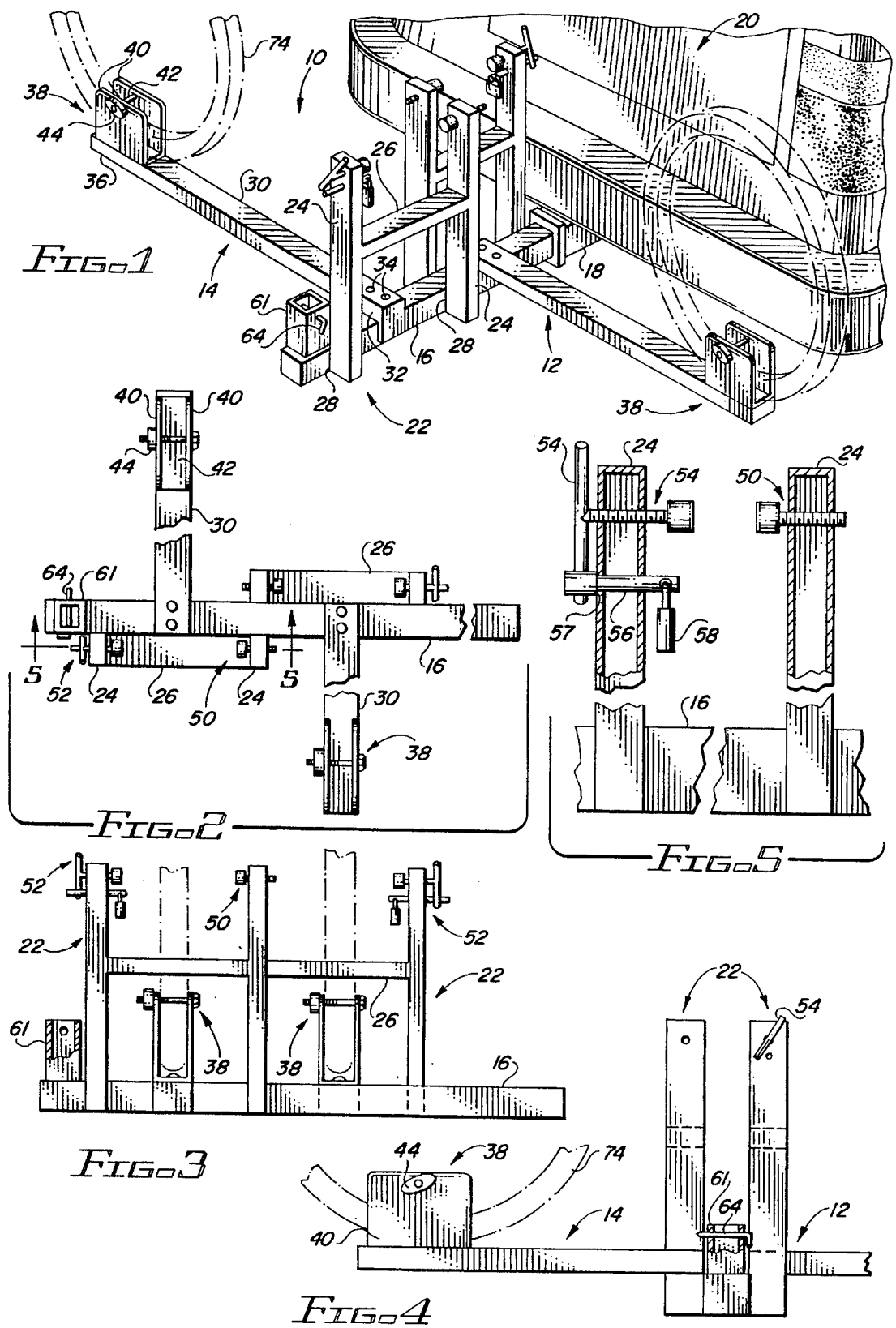

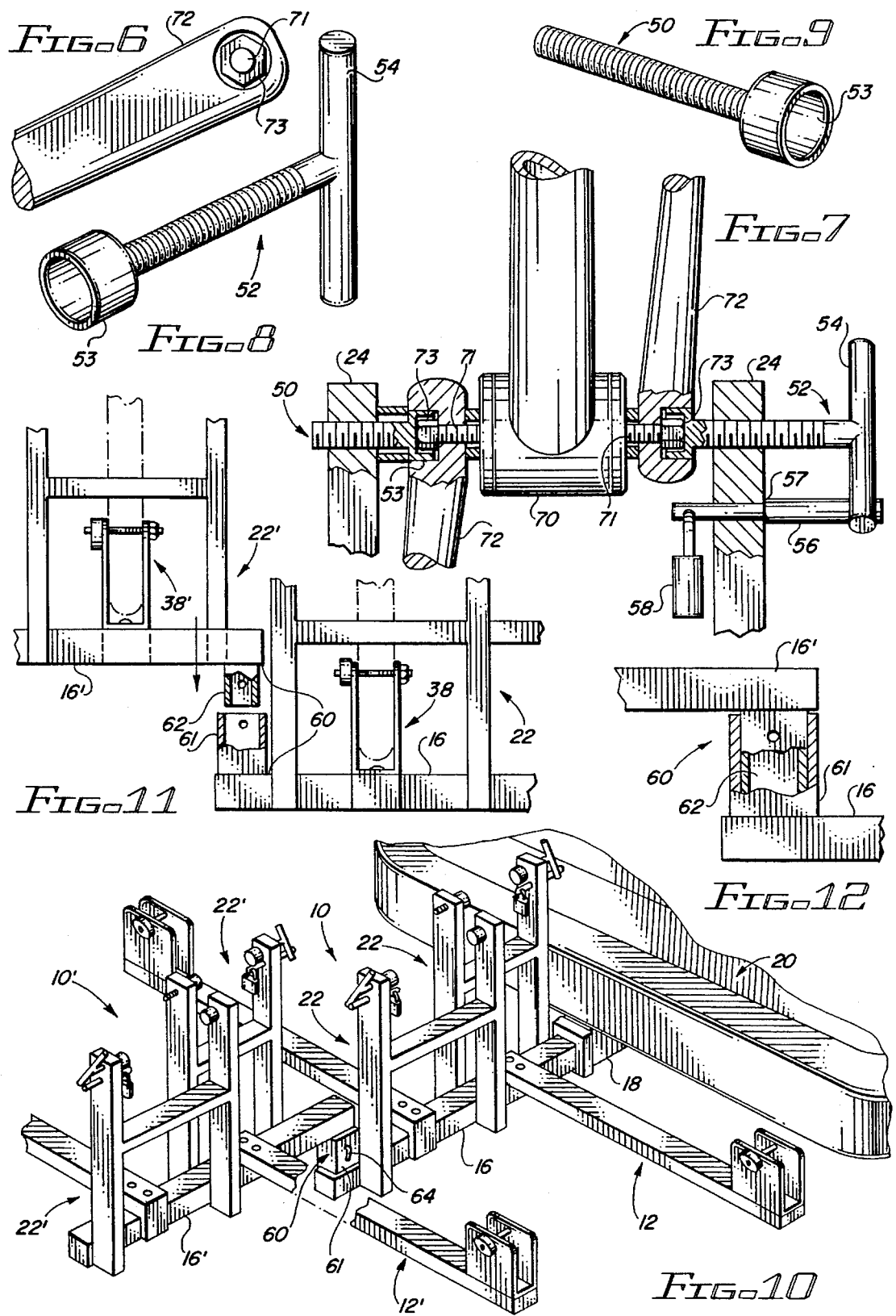

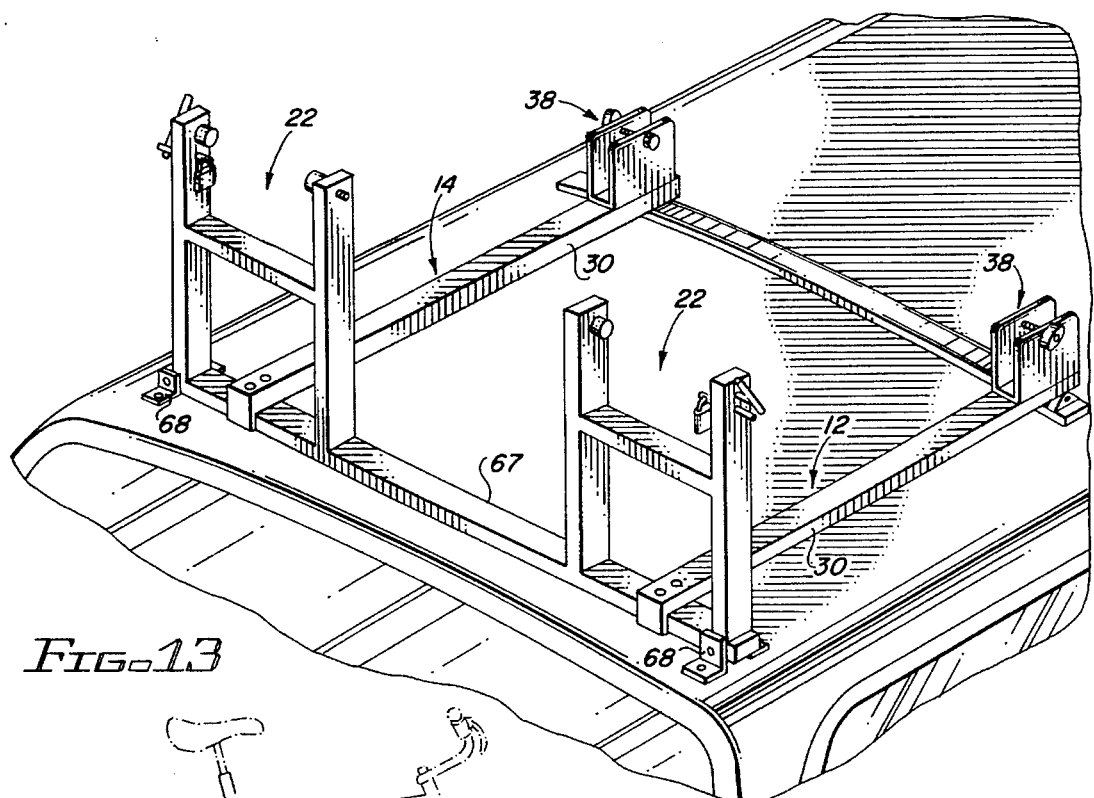
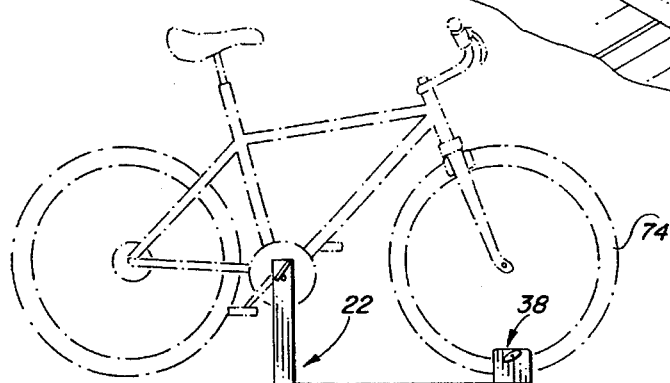
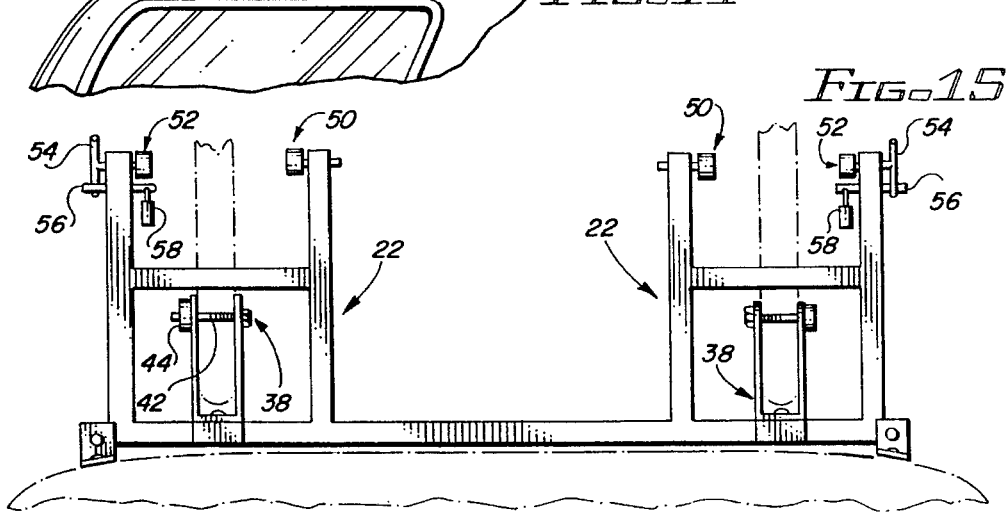

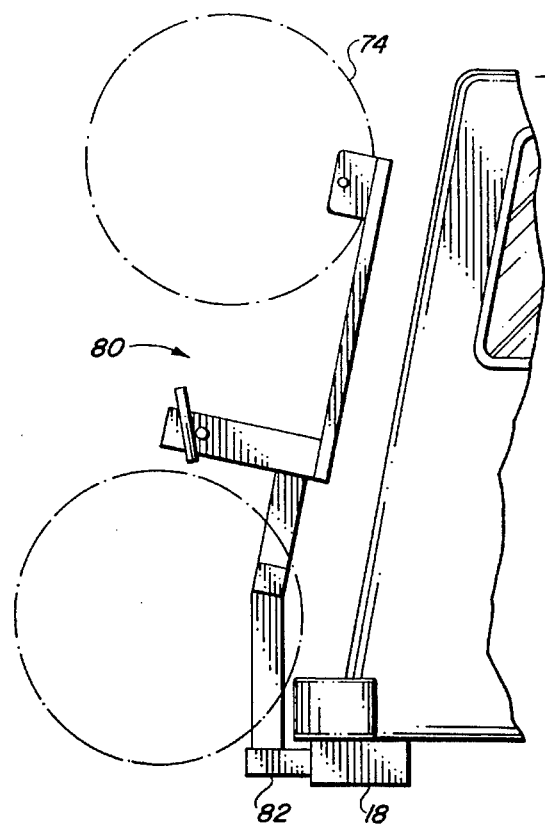
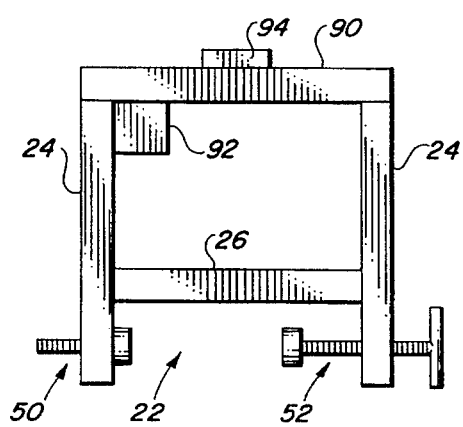
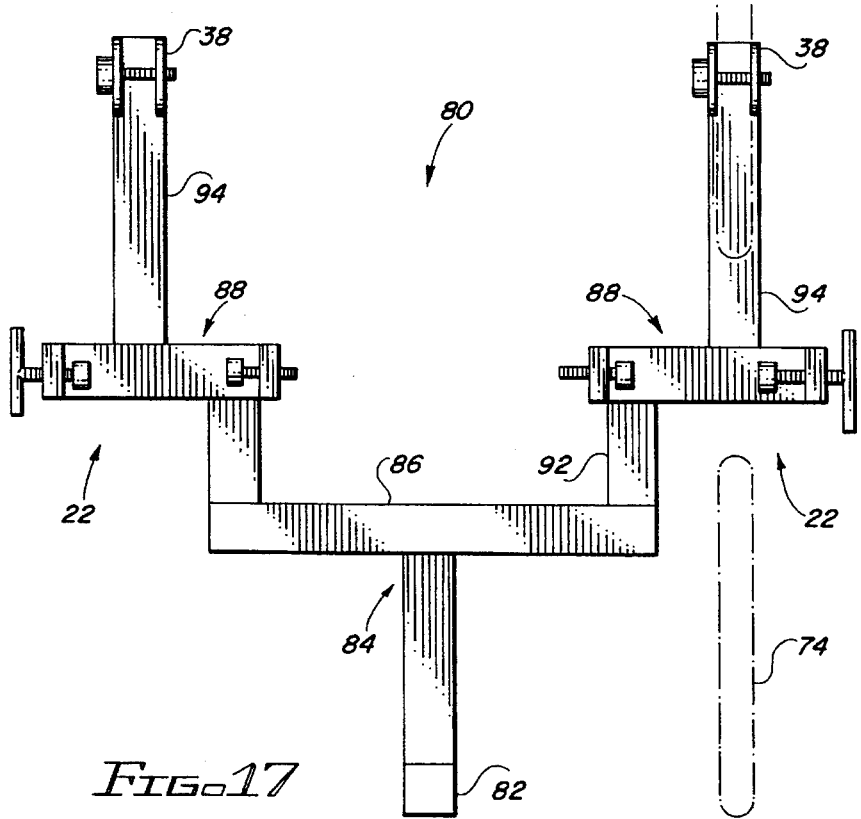

BICYCLE CRANK SHAFT SUPPORT CARRIER

BACKGROUND OF THE INVENTION

1. Field of the Invention

This invention relates to a bicycle carrier adapted for mounting on a motor vehicle and, more particularly, to apparatus for retaining one or more bicycles in a support arrangement which may be mounted on top of a car or in the receiver portion of a conventional vehicle trailer hitch.

2. Description of the Related Art

Bicycle riding has long been a popular recreational activity. In particular, in metropolitan areas and their environs, bicycle paths are maintained for the exclusive use of recreational bicycle riders in parks, along beaches and other available open flatland. Access to areas where facilities for safe, off-road bicycle riding are provided is generally accomplished by motor vehicles which are usually equipped in one way or another with racks or carriers for transporting the bicycles. Moreover, in the past few years, so-called "mountain bikes", motocross competition and other off-road cycling have become increasingly popular. Again, access to areas where such activities are permitted is generally by means of motor vehicles equipped to transport the bicycles.

For many years, more or less standard bicycle transport arrangements have sufficed for the purposes of transporting bicycles by means of motor vehicles. The more conventional carrier racks generally incorporated a provision for supporting the rack on the vehicle bumper, either front or rear, with an arrangement for hanging the bicycle on the carrier and tying or strapping it in place. Oftentimes the carrier rack includes means for connecting the upper end of the carrier to the vehicle to secure it in place. One common type of rack is arranged to hang the top bar of the bicycle frames of two or three bicycles from a pair of horizontal support members with the bicycles being tied together and also to the vehicle. In such an arrangement, the bicycles usually rub and bump together, causing scuffing of the paint finish on the bicycle and/or the transport vehicle with possibly other damage as well. This problem with this type of rack has been exacerbated with the development of modern bicycles having varying shapes and sizes of frames which preclude their hanging properly. Having the bicycles rub or bump together during transport is clearly unsatisfactory, considering that a good mountain or road bike costs in the range of $800.00 to $3000.00.

Allen U.S. Pat. No. 5,232,134 discloses a bicycle carrying system which is particularly designed to carry a plurality of bicycles in a manner which maintains spatial separation between them, thereby protecting them from the damage that may occur in the carrier rack systems of the type described above. The patent shows the use of straps as a means for securing the bicycles in place on the bicycle support frame. It also calls for removing the front wheel from the bicycle fork before mounting the bicycle on the carrier frame.

The Hannes et al U.S. Pat. No. 5,092,504 discloses a bicycle rack which is provided for the cargo compartment of a pickup truck. While this disclosure involves a mechanical arrangement which is more secure than using straps to mount the bicycles to the rack, it is still somewhat cumbersome to use because it calls for removing the front wheel from the bicycle fork before mounting the bicycle to the rack.

Cole U.S. Pat. No. 4,524,893 discloses a bicycle carrier for mounting on top of a motor vehicle, such as a station wagon. A U-shaped stanchion has a clamping mechanism to retain the bicycle in upright position. Straps are used for holding the bicycle wheels in position.

Carriers for enabling motorcycles to be transported at the front or rear of motor vehicles are also known in the prior art but these generally involve different design considerations from bicycle carriers because of the substantially greater weight and handling difficulty of motorcycles.

A preferred bicycle carrier for motor vehicle transport is one that separates the bicycles from touching each other and will hold the bicycles securely in place. It should have mounting points which are common to most bicycles and should be easy to use, both with respect to installation on the transport vehicle and in placement of the bicycles on the carriers.

SUMMARY OF THE INVENTION

Arrangements in accordance with the present invention satisfy the design criteria of the preferred bicycle carrier described above. These arrangements incorporate a mounting or support frame containing threaded clamping elements which readily grip the bicycle frame at what is probably its strongest point the part which is commonly called the bottom bracket. This is the bearing-supported shaft that the crank arms are bolted to. Each end of the support shaft has a crank arm mounting bolt which is typically recessed into the crank arm, thereby leaving a round cavity to receive a threaded clamping member having a cup-shaped end. This cup-shaped end receives the head of the crank arm bolt and bears against the crank arm bolt head, and thus the crank support shaft, when the clamping members are tightened in place. Both of these clamping members, one on each side of the crank support shaft, are threaded into upstanding arms of the support frame. The frame for the support assembly is preferably made from steel box tubing, although it could be made of any other suitable material such as aluminum, rigid plastic and the like. The tubing is welded in an H-shape with a cross-bar providing rigidity for the two side arms.

One of the threaded clamping members is manually located in its corresponding arm of the support frame. This is usually positioned with its cup-shaped end flush against the surface of the corresponding arm, thereby precluding it from being backed out from engagement with the crank farm by would-be thieves. If need be, a spacer or bushing may be used to effect desired positioning of this clamping member.

The other clamping member has a longer threaded portion terminating as a tee handle on the outside of the frame. This tee handle provides leverage to tighten the associated clamping member against the adjacent crank arm bolt and the support shaft when a bicycle is in position to be mounted on the carrier. The tee handle also co-acts with a locking pin which is slipped through an adjacent hole in the upstanding frame arm in which the tee handled clamping member is threaded. The position of the locking pin is sufficiently close to the axis of the threaded clamping member that it interferes with the tee handle, thereby preventing it from being rotated to release the clamping member. A padlock through a hole in the inner end of the locking pin prevents its removal and thus protects against theft of the bicycle mounted in the support frame.

The clamping arrangement as thus described provides solid and effective support at the approximate midpoint of the bicycle. The rest of the bicycle carrier comprises a transverse support arm extending laterally from the vicinity of the support frame and having at its distal end a clamping device of the type described in co-pending application Ser. No. 08/184,991, filed Jan. 24, 1994, entitled BICYCLE CARRIER FOR MOTOR VEHICLES, of this inventor and Terry L. Harris. The disclosure of that application is incorporated herein as though recited in haec verba.

Briefly, this clamping device at the distal end of the transverse support arm comprises a pair of opposed parallel plates affixed to the support arm and extending orthogonally therefrom. A threaded bolt and nut combination is positioned through holes near the outer edges of these two plates and is used to draw the plates toward one another once a bicycle wheel is positioned between the plates, thereby frictionally engaging the tire and securely retaining the bicycle wheel therein. That clamping device can also be locked, if desired.

Accordingly, an individual bicycle carrier in accordance with the present invention includes at a proximal end a support frame containing opposed adjustable clamping members for gripping the bicycle at the crank arm support shaft and a transverse support arm having at its distal end a parallel plate clamping device for the wheel. Preferably a bicycle is positioned on an individual carrier so that the front wheel is gripped by the parallel plate clamp.

The carrier itself is mounted on a longitudinal support member which is fabricated of box tubing of suitable dimensions to fit the opening of the standard receiver portion of a conventional trailer hitch of the Class C type or equivalent. This receiver portion is part of the hitch affixed to a vehicle and has its opening positioned immediately below the vehicle rear bumper. The transverse support arm of the carrier is attached by bolting the proximal end to the longitudinal support member while the H-shaped support frame is mounted by welding the lower ends of the side arms to the support member. Preferably a pair of individual bicycle carriers are mounted on this longitudinal support member and oriented in opposite directions relative to each other so that the bicycles are staggered and face in opposite directions for minimum interference between them.

In accordance with a further aspect of the invention, provision is made for the addition of a second carrier apparatus for transporting an additional pair of bicycles so that as many as four bicycles may be readily transported in a compact arrangement extending from the trailer hitch receiver portion at the rear of the vehicle. In accordance with this aspect of the invention, a receiver socket is preferably welded to the outer end of the primary longitudinal support member, oriented vertically to extend upwardly therefrom. This receiver socket is conveniently of the same dimensions as the receiver portion of the trailer hitch. A mating stub, preferably fabricated from the same stock as the longitudinal support member, is welded to the underside of the longitudinal support member of the second carrier apparatus. When it is desired to attach the second carrier apparatus to the first, the stub is inserted into the receiver socket and retained by a retainer pin. This provides a very rigid and secure bicycle carrier apparatus which is readily expanded in capacity from two bicycles to four.

Another preferred embodiment of the invention comprises a variation of the carrier apparatus just described, adapted for use as a cartop carrier. In this embodiment, a pair of individual bicycle carriers, each comprising an H-shaped support frame and extended support arm with parallel plate clamping device as described hereinabove, are mounted to a box-tube crossbar in a rigid configuration which may be installed in place on top of a car or other vehicle, secured to a standard cartop rack or otherwise held in place by straps, hooks, clamps or other conventional mounting means. In this configuration, of course, the individual bicycle carriers are aligned longitudinally with the vehicle so that there is no longitudinal support member as such, the crossbar being the support member to which the individual bicycle carriers are affixed.

Still another arrangement in accordance with the invention comprises a pair of individual bicycle carriers mounted on a frame to support the bicycles in a vertical orientation extending upwardly above the bumper of the transport vehicle. In this arrangement, a truncated support member is designed for installing in the receiver portion of the vehicle trailer hitch, as previously described. A generally T-shaped support is welded to the support member so as to extend vertically therefrom. A pair of upwardly extending, inverted L-shaped members are affixed to the outer ends of the horizontal cross bar of the T-shaped support. The individual bicycle carriers, each including an H-shaped support frame with opposed clamping members and an extended support arm and parallel plate tire clamp mounted thereon, are affixed to the respective horizontal portions of the L-shaped supports. This arrangement rigidly and securely supports a pair of bicycles in a configuration extending upwardly along the back of the transport vehicle with a minimum of projection behind the vehicle.

BRIEF DESCRIPTION OF THE DRAWING

A better understanding of the present invention may be realized from a consideration of the following detailed description, taken in conjunction with the accompanying drawing, in which:

FIG. 1 is a schematic perspective view of one particular arrangement in accordance with the invention shown mounted to a trailer hitch at the back of a transport vehicle;

FIG. 2 is a schematic plan view of the arrangement of FIG. 1;

FIG. 3 is a schematic right side elevation of the arrangement of FIG. 1;

FIG. 4 is a schematic rear elevation of a portion of the arrangement of FIG. 1;

FIG. 5 is a schematic view, partially broken away along the line 5—5 of FIG. 4, showing particular details of a portion of the clamping arrangement of the invention;

FIG. 6 is a schematic view of a conventional bicycle crank showing the attachment point for a clamping member of the present invention;

FIG. 7 is a schematic view, partially broken away, showing a bicycle crank and shaft assembly clamped in a particular portion of the apparatus of FIG. 1;

FIG. 8 shows one particular threaded clamping element of the arrangement of FIG. 7;

FIG. 9 shows another clamping element of the arrangement of FIG. 7;

FIG. 10 is a schematic perspective view, partially broken away, of a second particular arrangement in accordance with the invention providing additional unit carrying capacity;

FIG. 11 is a schematic elevational view, partially broken away, of a particular portion of the arrangement of FIG. 10;

FIG. 12 is a schematic view, partially broken away, showing particular details of FIG. 11;

FIG. 13 is a schematic perspective view of still another particular arrangement in accordance with the present invention, adapted for mounting on top of a motor vehicle;

FIG. 14 is a schematic side elevational view of the arrangement of FIG. 13;

FIG. 15 is a schematic elevational view, taken from the rear, of the arrangement of FIG. 13;

FIG. 16 is a schematic view in side elevation of yet another particular arrangement in accordance with the present invention, adapted for extending upwardly along the rear of a motor vehicle;

FIG. 17 is a schematic view in rear elevation of the carrier apparatus of FIG. 16; and FIG. 18 is a schematic plan view of a portion of FIG. 17.

DETAILED DESCRIPTION OF THE PREFERRED EMBODIMENTS

A first preferred embodiment of the invention is represented in FIGS. 1–5 which show a carrier apparatus 10 comprising a first bicycle carrier 12 and second bicycle carrier 14 affixed to a longitudinal support member 16 which is mounted in the receiver portion 18 of a trailer hitch extending under the bumper of a transport vehicle 20, such as a station wagon. The individual bicycle carriers 12, 14 are affixed to extend in opposite directions from the support member 16 for balance and to better separate the bicycles carried thereon.

An individual bicycle carrier such as 14 has an H-shaped support frame 22 formed of a pair of upstanding arms or vertical side bars 24 with a crossbar 26 connected between them for added rigidity. The side bars 24 are affixed, as by welding, to the longitudinal support member 16 at their lower ends 28. Associated with the H-frame 22 is a transverse support arm 30 which is secured at a proximal end 32 by a pair of mounting bolts 34. At the distal end 36 of a transverse support arm 30 is a clamping device 38 comprising a pair of opposed parallel side plates 40 which are attached to the transverse support arm 30 on the upper side thereof. A bolt 42 extends through the two side plates 40 and has a nut 44 thereon for drawing the two side plates 40 together to clamp a bicycle wheel by frictionally engaging the tire thereof, as indicated by the front wheel of a bicycle shown in phantom outline secured within the clamping device 38 (FIGS. 1, 4 and 14).

As may be seen in FIG. 5, one of the side bars 24 has a first threaded clamping member 50 installed therein. The other side bar 24 has a second threaded clamping member 52 threaded therein. Each of the clamping members 50, 52 is provided with a cup-shaped end element 53 provided for engaging a particular portion of the bicycle frame when it is mounted therein. This is best shown in FIG. 7 which depicts the bottom bracket 70 of a bicycle frame through which a shaft 71 extends to support the crank arms 72 on opposite ends thereof. The crank arms are secured to the shaft 71 by nuts 73. In the most commonly encountered configurations, the nut 73 is installed within a circular recess in the end of the crank arm 72. It is into this recess that the cup-shaped elements 53 of the first and second clamping members 50, 52 are inserted to grip the bicycle frame and support it in rigid suspension within the H-shaped support frame 22.

It will be noted that the second threaded clamping member 52 has a tee handle 54 at the outer end thereof. This handle serves to provide leverage for tightening the second clamping member 52, thereby firmly gripping the bicycle within the H-frame 24 at opposite ends of the shaft 71. The tee handle 54 also permits the clamping arrangement to be locked when a bicycle is clamped in place. Adjacent the threaded hole in which the second clamping member is installed is a second hole for a locking pin 56. This locking pin 56 has a shoulder 57 which, in cooperation with a padlock 58 on the opposite side of the side bar 24, serves to maintain the locking pin 56 in place. The pin 56 is of sufficient length to extend within the radius of the circle circumscribed by the tee handle 54, thereby interfering with full rotation of the tee handle 54 and preventing loosening of the clamping mechanism.

FIG. 10 shows a pair of bicycle carrier apparatus 10, 10' joined together by a connector assembly 60 and mounted for transport in the receiver portion 18 of a trailer hitch on the vehicle 20. Further details of the connector assembly 60 are shown in FIGS. 11 and 12. A receiver socket 61 having the same cross-sectional dimensions as the receiver portion 18 of the trailer hitch on the vehicle 20 is affixed, as by welding, on the end of the longitudinal support member remote from the receiver portion 18 and at right angles to the member 16 (upper side). A stub having the same cross-sectional dimensions as the longitudinal support member 16 is welded to the underside of a second longitudinal support member 16' of the additional bicycle carrier apparatus 10'. The second carrier apparatus 10' is joined to the first carrier apparatus 10 by sliding the stub 62 into the receiver socket 61 where it is retained by a retaining pin 64. This provides a very rigid and secure connection between the first and second bicycle carrier apparatus 10, 10' which readily and securely adds capacity of another pair of bicycles to the carrier apparatus.

Another preferred embodiment of the invention in the form of a cartop carrier is depicted in FIGS. 13–15. In this embodiment, a pair of individual bicycle carriers 12 and 14 are mounted to a box-tube crossbar 67 in the manner already described with respect to the longitudinal support member 16 to form a rigid rack assembly. Each of the individual bicycle carriers comprises an H-shaped bottom bracket support frame 22 or 22" and an extended support arm 30 with corresponding clamping devices 38 of the type described hereinabove. The cartop carrier apparatus of FIGS. 13–15 is mounted on top of a vehicle where it is secured in place by straps or other conventional fasteners. The apparatus rests on support elements which are conventionally installed as standard cartop luggage racks on station wagons or the like. If desired, stabilizing support members in the form of feet 68 may be welded to the crossbar 67 for added support. One or two bicycles may be mounted in the cartop rack assembly as indicated in FIG. 14.

FIGS. 16–18 represent schematically still another arrangement in accordance with the invention. FIGS. 16 and 17 show carrier apparatus 80 mounted on a truncated longitudinal support member 82 which is received and retained in the trailer hitch receiver portion 18. As best seen in FIG. 17, the carrier apparatus 80 includes a T-shaped frame 84 welded at its base to the support member 82. The horizontal crossbar 86 of the T-shaped frame 84 has an inverted L-shaped frame member 88 welded to each of its outer ends. The member 88 comprises a horizontal support member 90 and a vertical element 92. Attached to each horizontal support member 90 is an elongate arm 94, at the distal end of which is a clamping device 38 of the type depicted in FIG. 1. Also mounted to the horizontal support member 90 are the side bars 24 of an H-shaped support frame 22. This is constructed as shown in FIG. 5, with threaded clamping members 50, 52.

The carrier apparatus 80 can carry a pair of bicycles clamped by the threaded clamping members 50, 52 of the respective H-shaped support frames 22 and the clamping devices 38 as described in connection with FIGS. 1–9. The support member 82, components of the T-shaped frame 84 and the upright elements 92 of the L-shaped frame members 88 are preferably constructed of square hollow tube stock of like dimensions. The elements of the H-shaped support frame 22, the horizontal support member 90 of the L-shaped frame member 88 and the elongate support arm 94 can be constructed of lighter weight hollow rectangular stock in view of the lighter loads imposed thereon.

Bicycle carrier apparatus in accordance with the present invention provide lightweight, rugged, economical carriers for bicycles when transported by motor vehicles. The apparatus is designed for ready attachment to a standard trailer hitch receiver. The apparatus is provided with a mating element of a simple connector assembly so that the capacity of a standard carrier apparatus may be doubled by simply adding a second carrier apparatus to the first. Bicycles mounted in such carrier apparatus are rigidly clamped at what is the strongest point of the bicycle and a further support is provided for the front wheel to stabilize the bicycle and keep the wheel from pivoting randomly during transport. A variation of the carrier apparatus which is designed for trailer hitch attachment is adapted as a cartop carrier rack. In this arrangement as well, the bicycles are securely mounted at their strongest frame point and the front wheel of the bicycle is securely clamped in place. The cartop rack assembly is designed for holding a pair of bicycles.

Although there have been described hereinabove various specific arrangements of a bicycle crank shaft support carrier in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A bicycle carrier apparatus for supporting a bicycle by engaging the bicycle crank arms during transportation by a motor vehicle comprising:

an elongate support member for coupling to a motor vehicle for support thereby;

at least one individual bicycle carrier connected to the support member to support a bicycle aligned generally orthogonally to the support member, the carrier including:

a support frame having a pair of clamping member support elements positioned to extend on opposite sides of a bicycle mounted therein; and a pair of axially opposed threaded clamping members aligned along an axis which is coaxial with the crank arm support shaft of a bicycle mounted in the support frame and threadably engaged in respective ones of said support elements, said clamping members having inner ends which are configured to engage the heads of the bicycle crank arm mounting bolts from opposite sides of the bicycle.

2. The apparatus of claim 1 wherein said support frame is generally H-shaped with a pair of upright side bars affixed at opposite ends of a rigid cross bar, the base of each side bar being attached to the elongate support member.

3. The apparatus of claim 2 wherein each of the first and second threaded clamping members has a generally cup-shaped inner end for mating with the adjacent configuration of the crank arm and associated crank arm mounting bolt at the end of the crank arm shaft of a bicycle clamped therein.

4. The apparatus of claim 3 wherein at least one of said threaded clamping members includes a handle on the outer end of the clamping member for providing leverage to tighten the threaded clamping members against the shaft-mounted bolts securing the bicycle crank arms.

5. The apparatus of claim 4 wherein said handle is T-shaped, and further including means for blocking the rotation of said handle to prevent release of the bicycle crank arms from the clamping members.

6. The apparatus of claim 5 wherein said blocking means comprise a pin extending through a hole in said side arm adjacent the opening in which the T-handled clamping member is threaded, said pin having a padlock affixed thereto on one side of the side bar in which it is mounted and an enlarged shoulder portion in the end remote from the padlock to prevent it from being drawn through the side bar, said pin serving to prevent rotation of the T-handled clamping member when locked in position.

7. The apparatus of claim 3 further including a transverse support arm having its proximal end connected to the support member, the support arm having a clamping device affixed thereto at a distal end thereof for releasably securing a bicycle front wheel in the clamping device.

8. The apparatus of claim 7 further including an additional elongate support member having at least one individual bicycle carrier positioned thereon, and a connector assembly comprising a receiver socket attached to the distal end of the first-mentioned elongate support member and extending from the upper side thereof, a mating stub attached to the underside of the additional elongate support member, and a retaining pin for retaining the stub within the receiver socket when installed therein.

9. The apparatus of claim 7 wherein the base of each side bar of the H-shaped support frame is attached to the elongate support member by welding and wherein the proximal end of transverse support arm is connected to the support member by mounting bolts at a point midway between the two side bars.

10. The apparatus of claim 1 wherein the elongate support member is formed of hollow box tubing having dimensions at the proximal end selected to mate within the hollow receiver portion of a trailer hitch.

11. The apparatus of claim 1 wherein the elongate support member is a transverse crossbar and wherein the bicycle carrier apparatus includes a pair of individual bicycle carriers adapted for cartop mounting, the elongate support member being a hollow box tube crossbar extending between the two carriers.

12. The apparatus of claim 1 wherein the apparatus comprises a pair of individual bicycle carriers each being connected to its own elongate support member, each elongate support member constituting the horizontal bar of a corresponding inverted L-shaped frame member, the apparatus further comprising a T-shaped frame affixed to a support stub adapted to mate with the receiving portion of a vehicle-mounted trailer hitch, the vertical element of each L-shaped frame member being attached to a corresponding outer end of a crossbar of the T-shaped frame.

13. A clamping device for supporting a bicycle during transportation by a motor vehicle comprising:

a support frame having a pair of clamping member support elements positioned to extend on opposite sides of a bicycle mounted therein; and a pair of axially opposed threaded clamping members aligned along an axis which is coaxial with the crank arm support shaft of a bicycle mounted in the support frame and threadably engaged in respective ones of said support elements, said clamping members having inner ends which are configured to engage the heads of the bicycle crank arm mounting bolts from opposite sides of the bicycle.

14. The clamping device of claim 13 wherein said support frame is generally H-shaped with a pair of upright side bars affixed at opposite ends of a rigid crossbar, and further including means for mounting the support frame to a motor vehicle.

15. The clamping device of claim 14 wherein each of the first and second threaded clamping members is configured with a generally cup-shaped inner end for mating with a crank arm recess and crank arm mounting bolt at the end of a crank arm shaft of a bicycle mounted in the support frame.

16. The clamping device of claim 15 wherein said second threaded clamping member includes a handle on the outer end of the clamping member for providing leverage to tighten the threaded clamping members against the shaft-mounted ends of the bicycle crank arms.

17. The clamping device of claim 16 wherein said handle is T-shaped and further including means for blocking the rotation of said handle to prevent release of the bicycle crank arms from the clamping members.

18. The clamping device of claim 17 wherein said blocking means comprise a pin extending through a hole in said side arm adjacent the opening in which the T-handled clamping member is threaded, said pin having a padlock affixed thereto on one side of the side bar in which it is mounted and an enlarged shoulder portion in the end remote from the padlock to prevent it from being drawn through the side bar, said pin serving to prevent rotation of the T-handled clamping member when locked in position.

19. The clamping device of claim 18 further including a spacer mounted on said first threaded clamping member to space the cup-shaped inner end away from the inner face of the corresponding side bar in order to prevent withdrawal of the first threaded clamping member from engagement with the adjacent crank arm when a bicycle is clamped and locked in the support frame.

* * * * *